(12) United States Patent
Kim et al.

(10) Patent No.: US 10,794,562 B2
(45) Date of Patent: Oct. 6, 2020

(54) VEHICLE OPTICAL SYSTEM AND VEHICLE LAMP USING THE SAME

(71) Applicant: SL Corporation, Daegu (KR)

(72) Inventors: Jong Woon Kim, Gyeongsangbuk-do (KR); Hyeong Do Kim, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/179,083

(22) Filed: Nov. 2, 2018

(65) Prior Publication Data
US 2019/0203898 A1    Jul. 4, 2019

(30) Foreign Application Priority Data
Dec. 29, 2017 (KR) .................. 10-2017-0184322

(51) Int. Cl.
| | |
|---|---|
| *F21S 41/275* | (2018.01) |
| *B60Q 1/04* | (2006.01) |
| *F21S 41/147* | (2018.01) |
| *F21Y 115/10* | (2016.01) |
| *F21S 41/143* | (2018.01) |

(52) U.S. Cl.
CPC .............. *F21S 41/275* (2018.01); *B60Q 1/04* (2013.01); *F21S 41/147* (2018.01); *F21S 41/143* (2018.01); *F21Y 2115/10* (2016.08)

(58) Field of Classification Search
CPC .......... B60Q 1/0052; F21V 5/04; F21V 5/008
USPC .................................................. 362/521–522
See application file for complete search history.

(56) References Cited

U.S. PATENT DOCUMENTS

| | | | |
|---|---|---|---|
| 2015/0029740 A1* | 1/2015 | Na ......................... | F21S 41/143 362/521 |
| 2015/0062905 A1* | 3/2015 | Huang .................. | B29C 39/026 362/268 |

* cited by examiner

*Primary Examiner* — William J Carter
(74) *Attorney, Agent, or Firm* — Nelson Mullins Riley & Scarborough LLP; Kongsik Kim, Esq.

(57) ABSTRACT

An optical system is provided. The optical system includes a first lens and a second lens disposed in front of the first lens. In particular, the second lens has a concave incidence surface, a curvature ratio between the first lens and the second lens is in a range of about 1.2 to 3.0, and the optical system receives a light emitted by a light-emitting unit in a range of about 60° or more.

17 Claims, 11 Drawing Sheets

R2 : 22.6967208375847

R5 : 7.56557260424373

R2/R5 = 3.0

VEHICLE OPTICAL SYSTEM AND VEHICLE LAMP USING THE SAME

CROSS-REFERENCE TO RELATED APPLICATION

This application claims priority from Korean Patent Application 10-2017-0184322 filed on Dec. 29, 2017, the disclosure of which is incorporated herein by reference in its entirety.

BACKGROUND

1. Field of the Disclosure

The present disclosure relates to a vehicle optical system, and more particularly, to a vehicle optical system including a pixelized light-emitting unit and having a high efficiency, and a vehicle lamp using the same.

2. Description of the Related Art

Generally, a vehicle includes various kinds of lamps having an illumination function to more easily identify objects disposed around the vehicle and a signal function to inform other vehicles or users of roads about a vehicle traveling state. For example, the vehicle mainly includes head lamps and fog lamps for the purpose of the illumination functions, turn signal lamps, tail lamps, brake lamps, side markers, and the like for the purpose of signaling functions. The installation standards and specifications of the vehicle lamps are specified by laws and regulations to ensure the performance of the vehicle lamps.

Among the vehicle lamps, the head lamp forms a low beam pattern or high beam pattern to secure a front sight of a driver's view and serves an important role for safe operation when the vehicle operates in a situation in which surroundings are dark, e.g., at night.

Such a head lamp mainly maintains the low beam pattern at normal times (e.g., when cruising) to prevent blinding drivers of oncoming vehicles that travels in the opposite direction or drivers of vehicles which travel in front of the vehicle, and when the vehicle travels at a high speed or travels an area in which surroundings are dark, the head lamp forms the high beam pattern in order to travel more safely.

Recently, high resolution vehicle head lamps are required, and a pixelized light-emitting source has been applied to the vehicle head lamp to control the light having units with a minimal size. To control the light having pixelized small units, a corresponding imagery lens optical system having a high resolution is required. A conventional imagery lens optical system is mainly a low efficiency optical system configured to receive a range of 30° or less of light.

SUMMARY

Aspects of the present disclosure provide a vehicle optical system including a pixelized light-emitting unit and having a high efficiency, and a lamp.

It should be noted that objects of the present disclosure are not limited to the above-described objects, and other objects of the present disclosure will be apparent to those skilled in the art from the following descriptions.

According to aspects of the present disclosure, an exemplary embodiment according to the present disclosure may have the following configuration.

An optical system according to an exemplary embodiment of the present disclosure may include a first lens, and a second lens disposed in front of the first lens and having a concave incidence surface. A curvature ratio between the first lens and the second lens may be in a range of about 1.2 to 3.0, and the optical system may receive light emitted by a light-emitting unit in a range of 60° or more.

A vehicle lamp according to another exemplary embodiment of the present disclosure may include a pixelized light-emitting unit and an optical lens configured to transmit light emitted by the light-emitting unit. The optical lens may include a first lens disposed proximate to the light-emitting unit and a second lens disposed farther from the light-emitting unit than the first lens and having a concave incidence surface. In particular, a curvature ratio between the first lens and the second lens may be in a range of about 1.2 to 3.0, and the optical lens may receive the light emitted by the light-emitting unit in a range of 60° or more.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION

Advantages and features of the present disclosure and methods of achieving the same will be clearly understood with reference to the accompanying drawings and the following exemplary embodiments. However, the present disclosure is not limited to the exemplary embodiments to be disclosed, but may be implemented in various different forms. The exemplary embodiments are provided to explain the present disclosure and the scope thereof to those skilled in the art. The scope of the present disclosure is defined by the appended claims. Throughout the specification, the same reference numbers refer to the same components.

Unless otherwise defined, all terms (including technical and scientific terms) used herein can be used as is customary in the art to which the present disclosure pertains. In addition, it will be further understood that terms, such as those defined in commonly used dictionaries, may not be interpreted in an idealized or overly formal sense unless expressly so defined herein.

The terms used herein are provided to merely describe the exemplary embodiments of the present disclosure and not for purposes of limitation. Unless the context clearly indicates otherwise, the singular forms include the plural forms. It will be understood that the terms "comprise" or "comprising" when used herein specify some stated components, steps, operations and/or elements, but do not preclude the presence or addition of one or more other components, steps, operations and/or elements.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
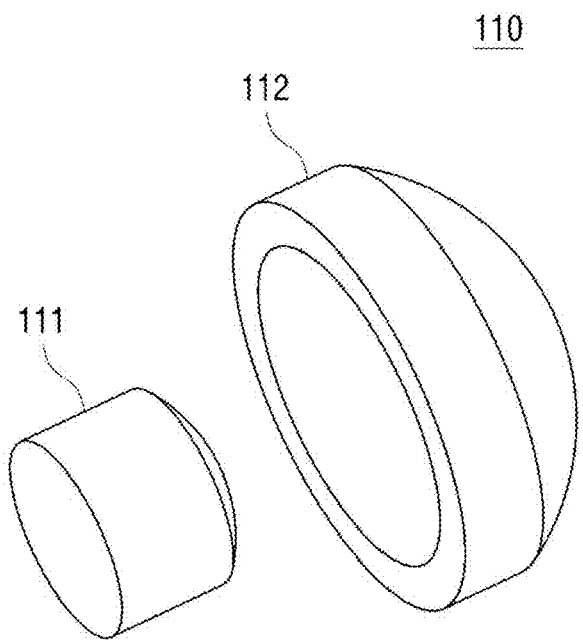
FIG. 1 is a perspective view illustrating an optical system according to an exemplary embodiment of the present disclosure.
Figure 2:
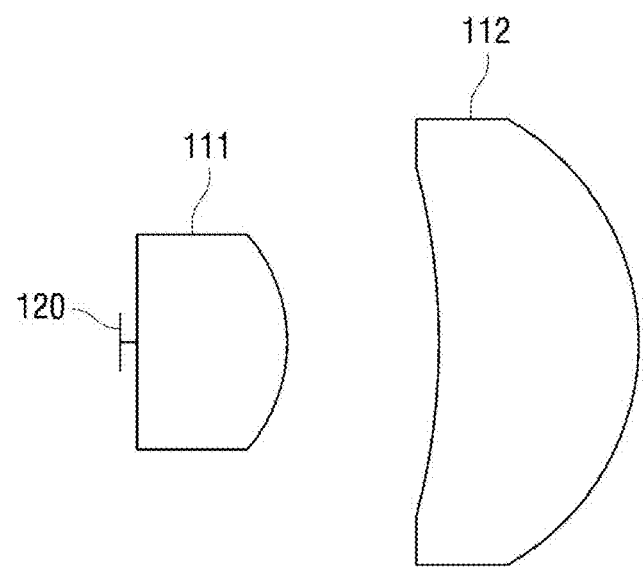
FIG. 2 is a vertical cross-sectional view illustrating the optical system according to the exemplary embodiment of the present disclosure.

Hereinafter, exemplary embodiments of the present disclosure will be described in detail referring to the accompanying drawings. A vehicle optical system applied to a pixelized light-emitting unit, a high efficiency optical system may be required to increase resolution. To form the high efficiency optical system suitable for the pixelized light-emitting unit, an optical system 110 according to an exemplary embodiment of the present disclosure may include a plurality of lens and receive light emitted by the light-emitting unit within a range of 60° or more. The optical system may include two lenses 111 and 112, and may also include three or more lenses. The optical system including the two lenses may be formed as illustrated in FIG. 1, and a cross-sectional view thereof is illustrated in FIG. 2.

The pixelized light-emitting unit may refer to a light-emitting unit that includes a plurality of light sources or a plurality of reflectors configured to reflect light emitted from a light source to generate the light in units of pixels. A lamp may be formed using a plurality of light sources, particularly, using a light source such as a light-emitting diode (LED), laser, and the like, or a plurality of reflectors such as a digital micro-mirror device (DMD) and the like. The lamp may also be formed using a μ-structured adaptive front-lighting system (μ-AFS) and the like. The lamp may receive the light emitted by the pixelized light-emitting unit within the range of 60° or more to increase an efficiency thereof.

Figure 3:
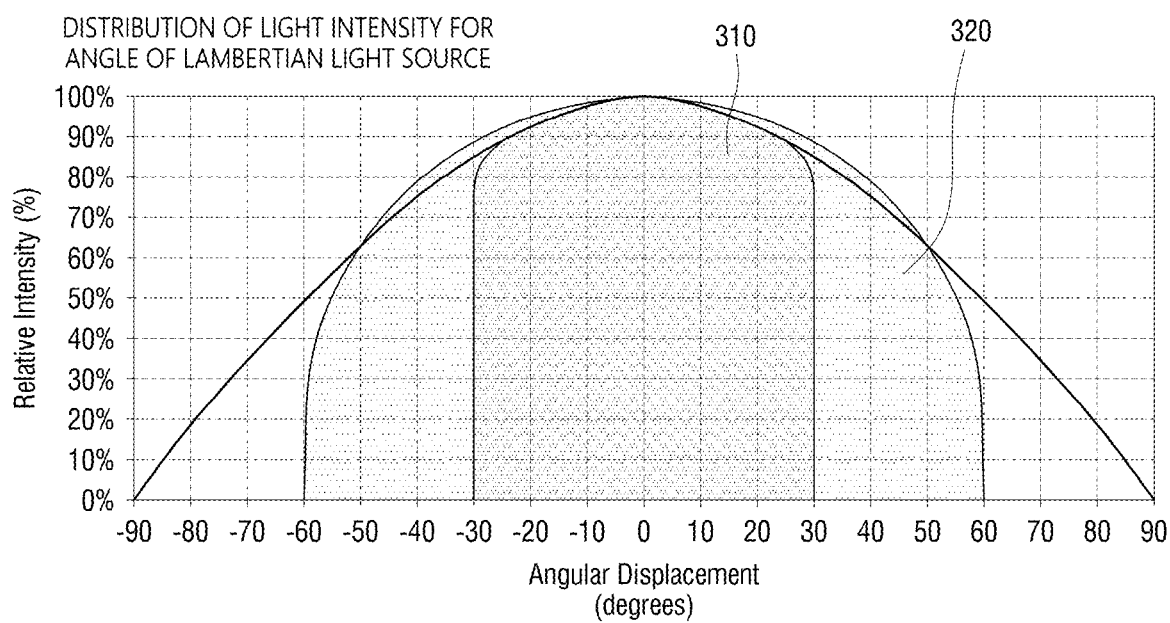
FIG. 3 is a graph showing light receiving regions of the optical system according to the exemplary embodiment of the present disclosure according to distribution of light intensity for each angle of a Lambertian light source.

An amount of energy according to an amount of received light may be expressed by a numerical aperture (NA). The NA is a value of sine, and may be regarded as a value obtained by integrating energy of a Lambertian light source. FIG. 3 is a graph showing light receiving regions according to distribution of light intensity for an angle of the Lambertian light source. FIG. 3 shows that when a light receiving angel is 30°, the NA is 0.5. However, when the range of 60° or more of light is received, the NA is calculated to be 0.866. Energy of the range of 30° of light corresponds to a region 310 of FIG. 3, and energy of the range of 60° of light corresponds to a region 320 of FIG. 3. When the light receiving angel is 30°, a light receiving efficiency may decrease, and an entire light intensity value may also decrease. Conversely, when a light receiving angel is 60° or more, a light receiving efficiency may increase to allow a high light intensity value to be maintained.

When 3072 lm is an input value and an NA of 0.866 and a lens efficiency of 88% (with two lenses) are considered, a light emission of 1784 lm may be obtained as follows.

$$\text{Theoretical Efficiency} = \text{Input} * NA^2 * \text{Lens Efficiency} = 3072 * 0.866 * 0.866 * 0.88 * 0.88 = 1784 \quad \text{Equation 1}$$

Accordingly, the lamp may have an efficiency of about 58%. More particularly, the lamp may have an intensity of 1500 lm, and an actual efficiency may be about 50% due to total reflection and light-emitting properties of an LED. Two lenses may be used to reduce Fresnel Loss or transmissivity.

The optical system according to the exemplary embodiment of the present disclosure may be formed to achieve a light intensity value of 40,500 cd or more from a light pattern formed by the light emitted by the light-emitting unit and passing through the lenses. In particular, the light pattern may be a light pattern projected at a distance of 25 m from the optical system. Since the optical system, which is applied to a vehicle lamp, may be formed to have a light intensity value in the range of about 40,500 cd to 215,000 cd to satisfy Adaptive Driving Beam (ADB) and high beam regulations, the optical system may be formed such that a light intensity value of the light pattern is about 40,500 cd or more. The optical system may be formed such that the light intensity value of the entire light pattern is about 40,500 cd or more, or a light intensity of a region, which corresponds to above a particular portion of the entire light pattern, is about 40,500 cd or more.

A size of each pixel which forms the light pattern may be in the range of about 0.15° to 0.35°. In addition, a view angle of the optical system may be in the range of about 4.8° to 11.2°, and the optical system may be formed with an effective focal distance in the range of about 28 mm to 70 mm.

When a light intensity value of the light pattern, which the optical system is required to satisfy, is set, a size of the pixel, a view angle, and an effective focal distance may be obtained within predetermined ranges to obtain the corresponding light intensity value. When an NA, an amount of energy consumed by lenses, and a luminous flux (lm) per pixel of the light-emitting unit are provided, a light intensity value per pixel may be obtained using an Etendue equation. In particular, the light intensity value may be calculated by the Etendue equation as follows:

$$\text{Light Intensity(cd)} = 3\ lm * NA^2 * \text{Lens Efficiency}/\text{Solid Angle} \quad \text{Equation 2}$$

where the Lens Efficiency $= 0.88^{the\ number\ of\ lenses}$, and the Solid Angle is a three dimensional angle. Although Fresnel loss and transmissivity may be applied to calculate light intensity more accurately, the efficiency of the lens of the vehicle optical system may be approximated to 0.88 for each lens.

When the Etendue equation is used, a range of a size per pixel may be in the range of about 0.15° to 0.35°, and when the obtained size of the pixel may be multiplied by the number of pixels, a size of the light pattern at 25 m may be obtained. When the number of pixels in width and length is 32×32 (for example: an optical system for EVIYOS of OSRAM), and when the obtained size of the pixel is multiplied by the number of pixels, the size of the light pattern may be in the range of about 4.8° to 11.2°.

Figure 4A:
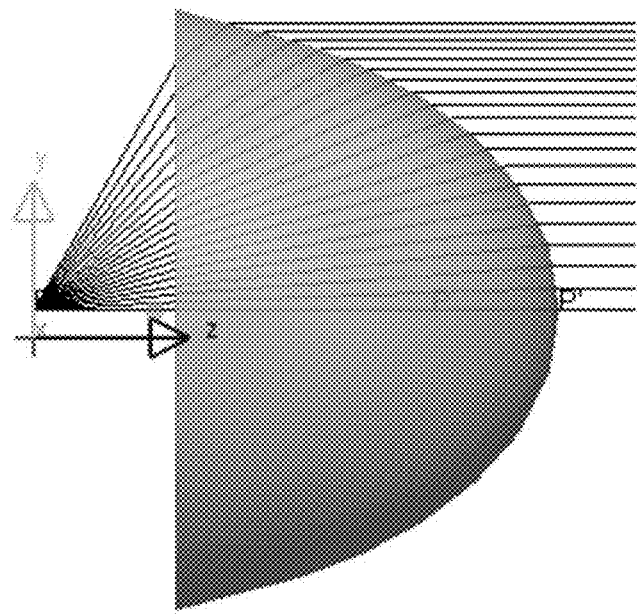
FIGS. 4A, 4B, 5A, 5B, 6A, and 6B are views showing sizes of beam patterns according to focal distances of the optical system according to the exemplary embodiment of the present disclosure.
Figure 4B:
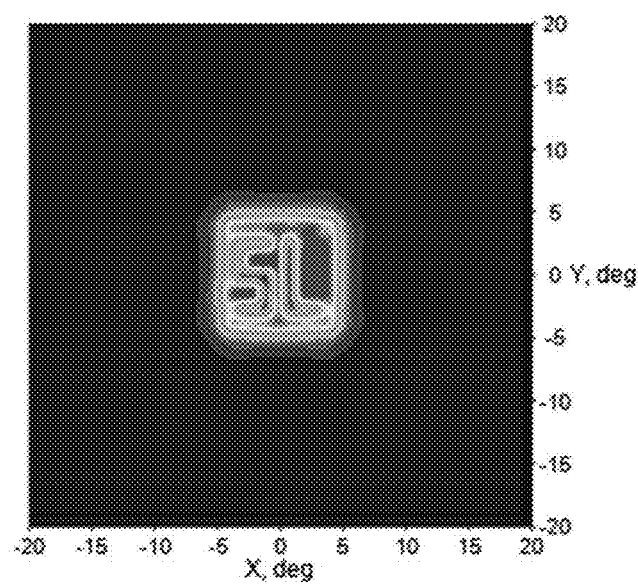
Figure 5A:
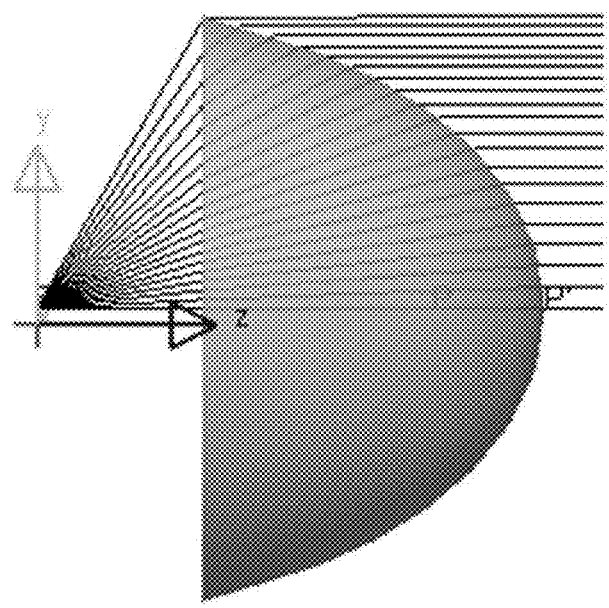
Figure 5B:
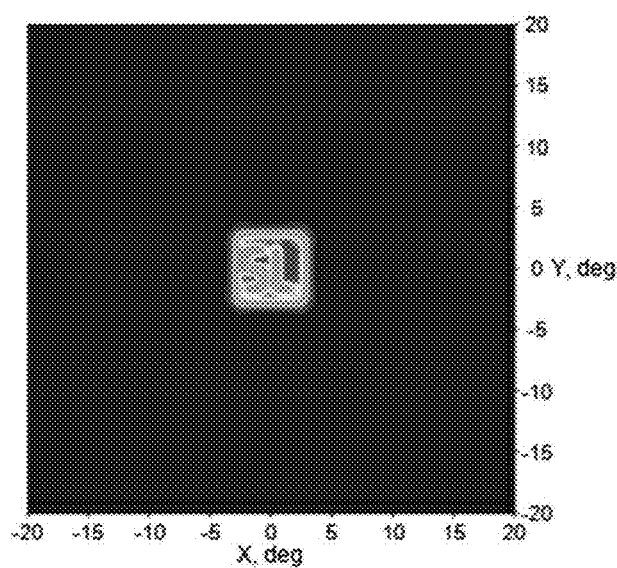
Figure 6A:
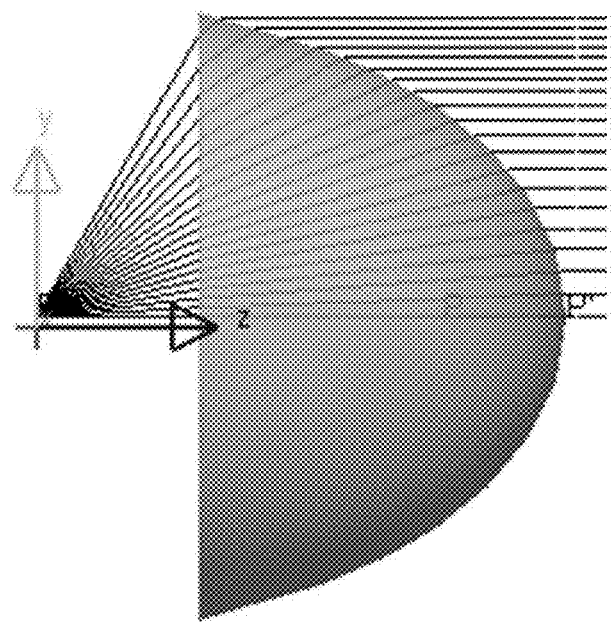
Figure 6B:
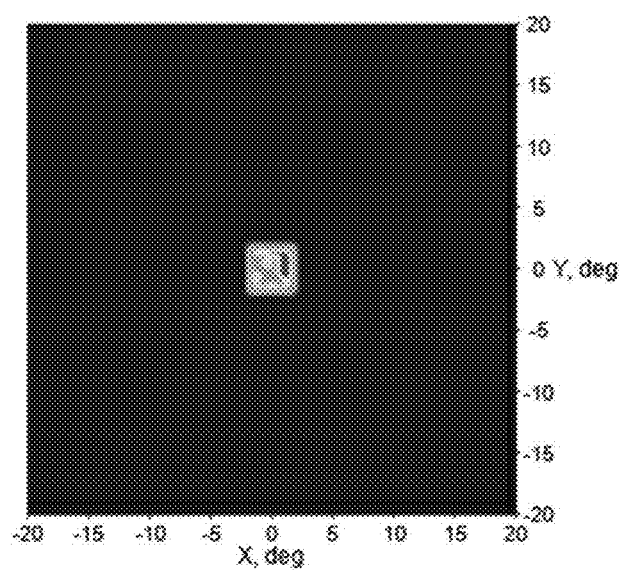

When the size of the light pattern and a size of the light-emitting unit (LED) are provided, a focal distance may be calculated by a correlation of y(half-length of diagonal line of light-emitting unit)=f(focal point)*tan θ(half-size of light pattern). When y is 2.828 mm (for example, the optical system for EVIYOS of OSRAM), a focal distance of the optical system may be in the range of about 28 mm to 70 mm. In particular, the size of the light pattern according to the focal distance is illustrated in FIGS. 4 to 6. FIGS. 4A and 4B are views in which the size of the light pattern is less than ±6° when the focal distance is 30 mm. FIGS. 5A and 5B are views in which the size of the light pattern is less than ±4° when the focal distance is 40 mm. FIGS. 6A and 6B are views in which the size of the light pattern is less than ±2° when the focal distance is 80 mm. When the focal distance is outside a required range as in FIG. 6, resolution may significantly decrease.

The optical system may include a first lens 111 and a second lens 112. The first lens 111 and the second lens 112 may be substantially aligned longitudinally along a direction of the light. The second lens 112 may be disposed in front of the first lens 111. In particular, the first lens 111 may be disposed more proximate to the light-emitting unit, and the second lens 112 may be disposed farther from the light-emitting unit than the first lens 111. As described above, to collect light at 25 m to form the light pattern, refractive power of the entire optical system may be positive (+). Although a partial surface of the lens may be concave, the entire optical system may be formed such that the refractive power is positive (+).

A refractive index of the first lens 111 disposed at a side of the light-emitting unit may be about 1.6 or more. Since the range of 60° or more of light to be received, the first lens 111 may be formed of a high refractive glass having a refractive index of about 1.6 or more. An incidence surface of the first lens 111 may be a flat surface or a surface similar to a flat surface (e.g., a substantially flat surface). The incidence surface of the first lens 111 may be the flat surface or the surface similar to the flat surface to receive the range of 60° or more of light.

A refractive index of the second lens 112 disposed spaced part from the light-emitting unit may in the range of about 1.4 to 1.7, and the second lens 112 may be formed of a material having a refractive index lower than the refractive index of the first lens 111. For example, the second lens 112 may be formed of a plastic material. An incidence surface of the second lens 112 may be concave. The concave incidence surface may minimize chromatic aberration. A meniscus lens be used to adjust the chromatic aberration since the chromatic aberration occurs due to difference in amount of collected light due to a different refractive index for wavelength on a positive (+) surface, and the chromatic aberration may be compensated for due to divergence of light on a negative (−) surface. A stop position may be set at a surface, which faces the light-emitting unit, of the second lens 112. Accordingly, a lens holder may also perform a stop function without using a separate structure.

Figure 7:
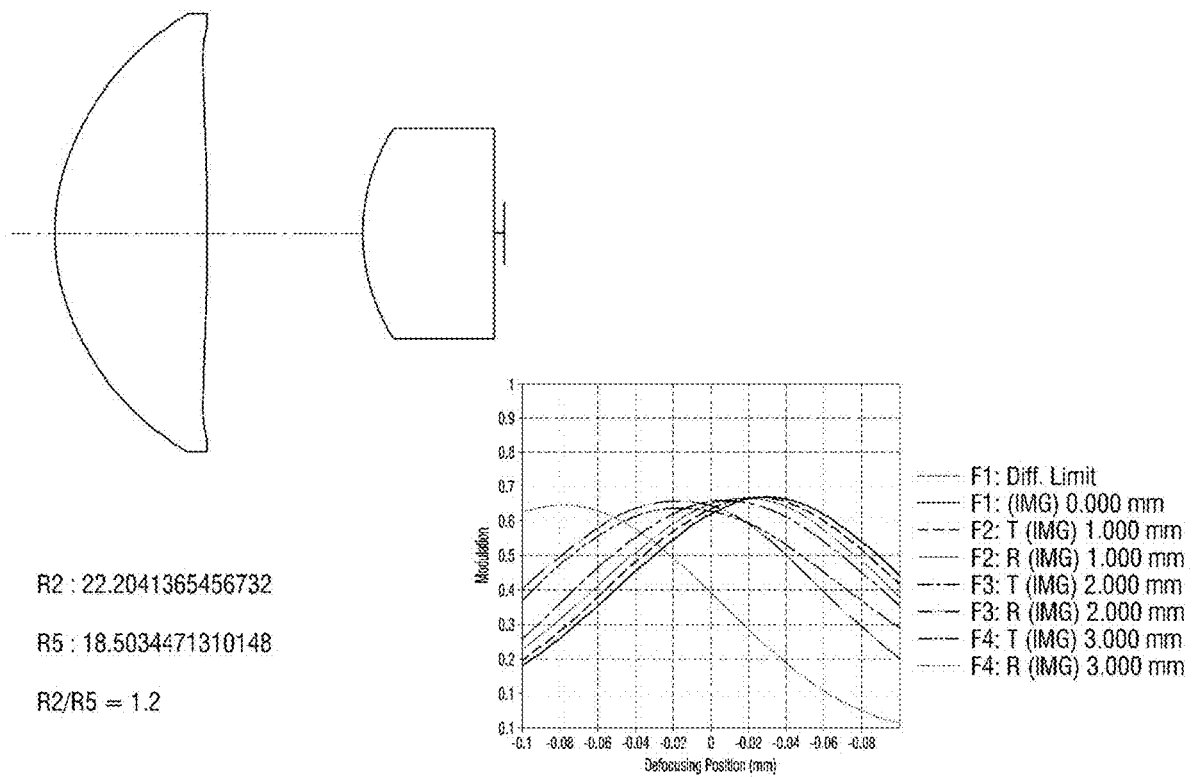
FIGS. 7 to 9 are modulation transfer function (MTF) graphs according to curvature ratios between first lens and second lens.
Figure 8:
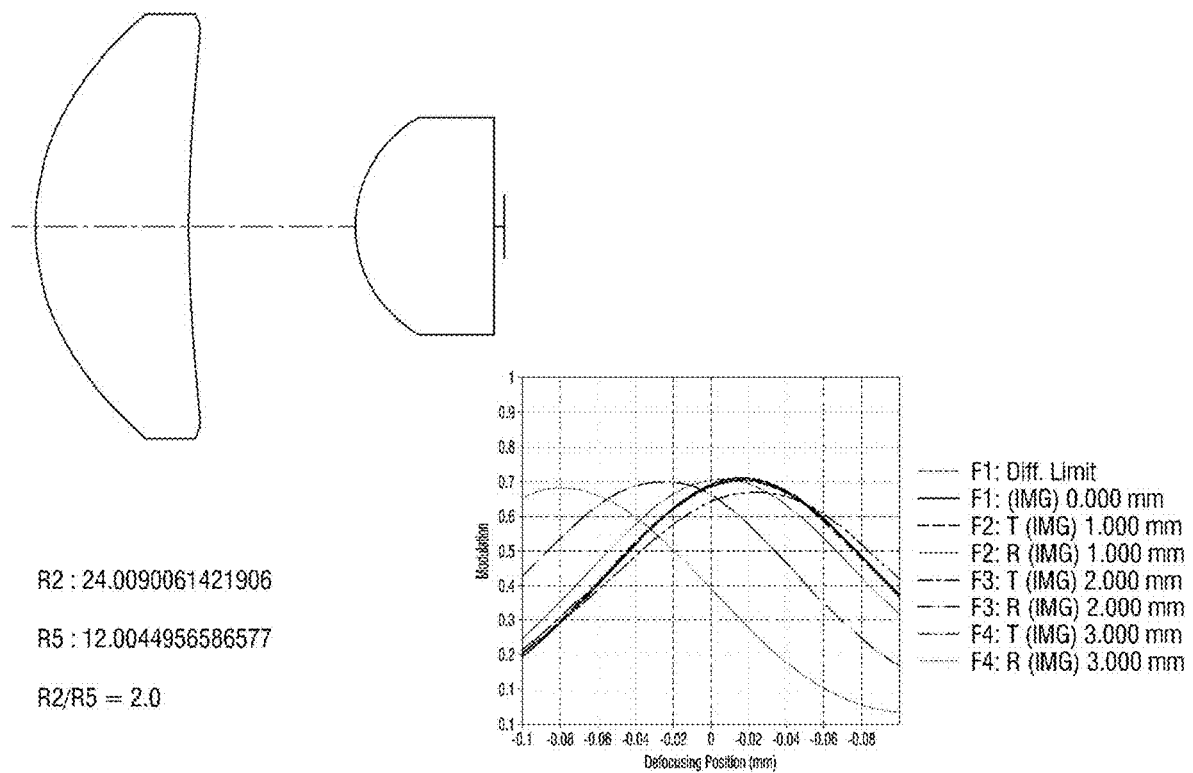
Figure 9:
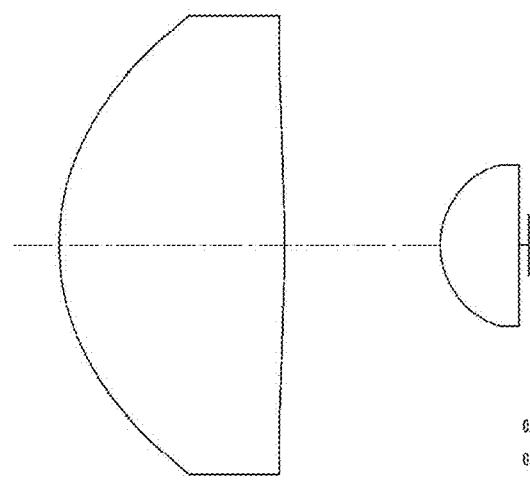
Figure 9:
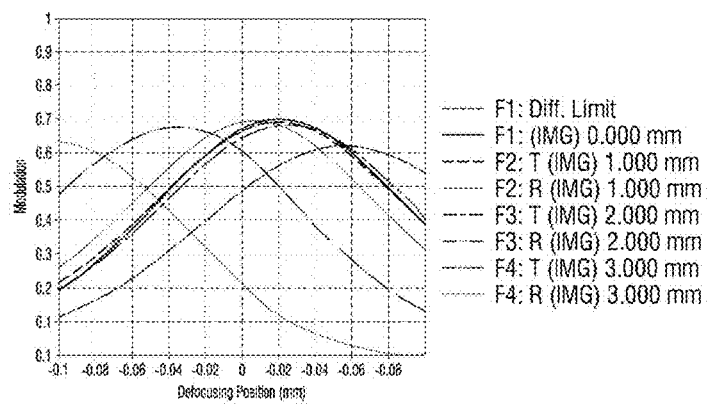

A curvature ratio between the first lens 111 and the second lens 112 may be in the range of about 1.2 to 3.0. When the curvature ratio is less than 1.2, performance of modulation transfer function (MTF) of a lens may start to decrease, and when the curvature ratio is greater than 3.0, a shape of the second lens 112 may be a double-convex lens shape instead of a meniscus shape. A radius of curvature of a light-emitting portion of the first lens 111 may be about 14.1522 mm, and a radius of curvature of a light-emitting portion of the second lens 112 may be about 24.1435 mm. The curvature ratio between the first lens and the second lens based on the radii of curvatures of the first lens and the second lens may be about 1.7. FIGS. 7 to 9 are MTF graphs according to the curvature ratios between the first lens and the second lens. In particular, FIG. 7 is the graph showing MTF when the curvature ratio is 1.2, FIG. 8 is the graph showing MTF when the curvature ratio is 2.0, and FIG. 9 is the graph showing MTF when the curvature ratio is 3.0.

Since the curvature ratio is an inverse of a radius of curvature, the curvature ratio may be calculated using a radius of curvature R5 of the first lens and a radius of curvature R2 of the second lens. The radius of curvature R5 may be a radius of curvature of an incidence surface, which is disposed in a direction opposite a direction in which the light-emitting unit is disposed, of the first lens, and the radius of curvature R2 may be a radius of curvature of a light-emitting surface, which is disposed in a direction opposite a direction in which the light-emitting unit is disposed, of the second lens. Accordingly, the curvature ratio between the first lens and the second lens may be calculated as R2/R5. In MTF for a curvature ratio, lines of MTF converge at the curvature ratio of 2.0 which is a middle of the curvature ratios. The convergence of lines of MTF may indicate that resolution and sharpness are high. However, in FIG. 7 in which the curvature ratio is 1.2 which is a lower value of the examples and FIG. 9 in which the curvature ratio is 3.0 which is an upper value of the examples, distances between lines of MTF increase, and when the curvature ratio is outside the range, the optical system may be difficult to use as a vehicle optical system.

Figure 10A:
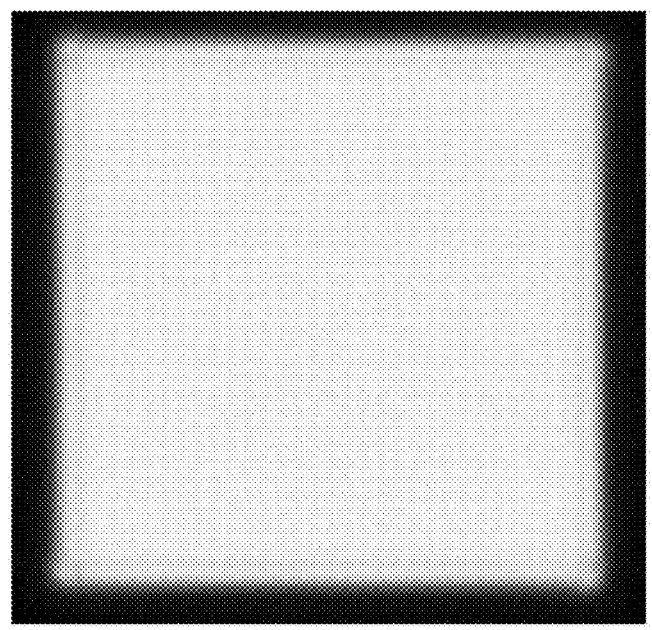
FIGS. 10A and 10B are views showing a beam pattern of the optical system according to the exemplary embodiment of the present disclosure.
Figure 10B:
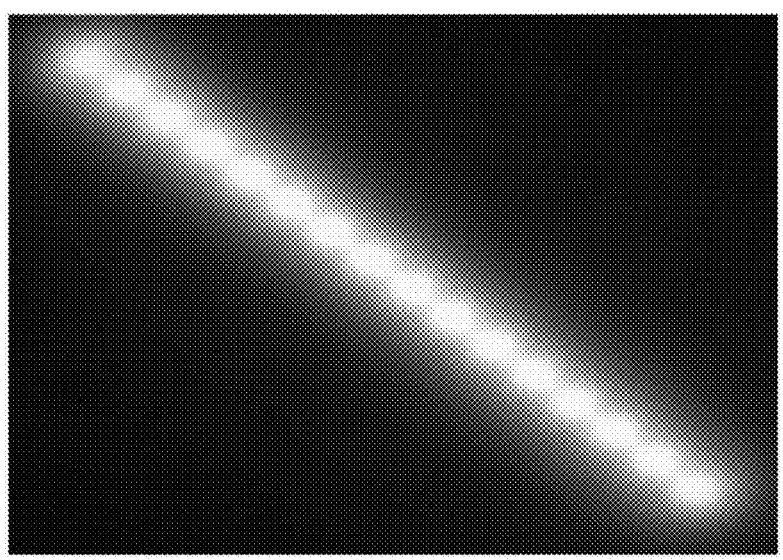
Figure 11:
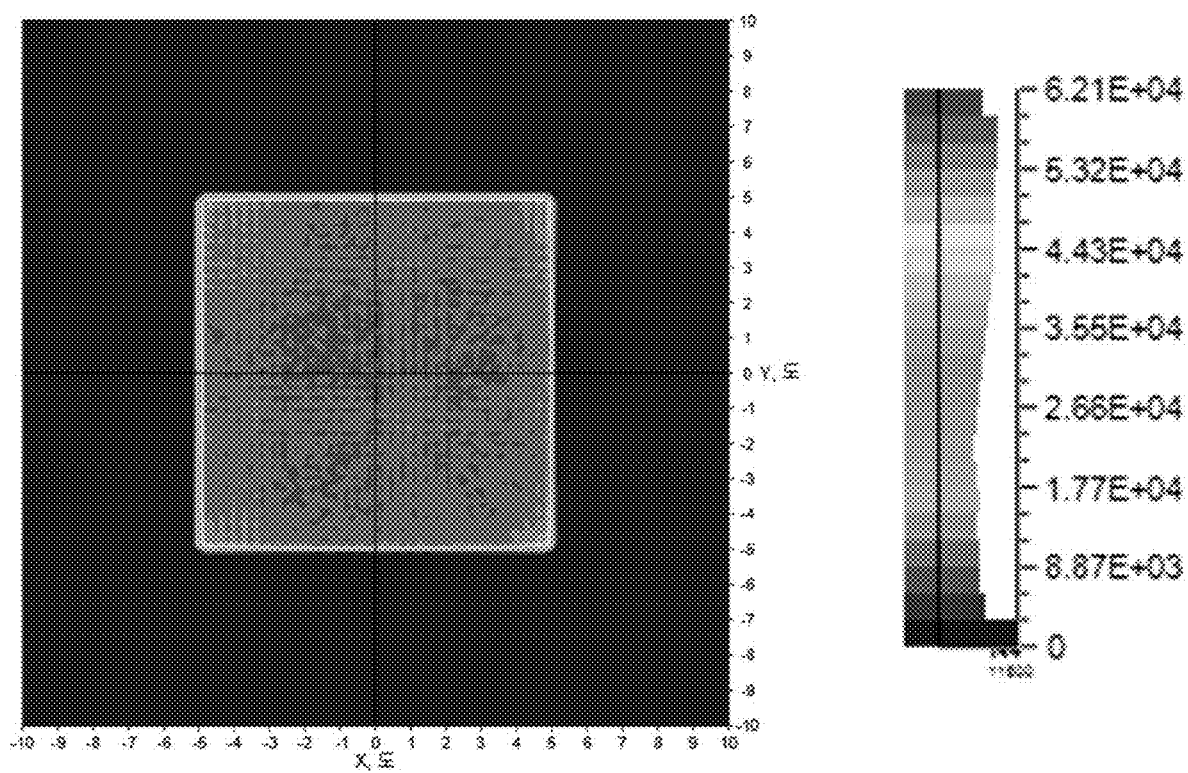
FIG. 11 is a view showing an intensity (cd) according to the beam pattern according to the exemplary embodiment of the present disclosure.

FIGS. 10A and 10B are images showing a light pattern formed by the light which passes through the optical system according to the exemplary embodiment of the present disclosure. FIG. 10A illustrates the light pattern when the entire optical system is turned on, and FIG. 10B illustrates the light pattern when the optical system is diagonally turned on. It may be seen that a difference in light intensity of the entire light pattern is not substantial. FIG. 11 is a view showing light intensity according to the beam pattern when the entire optical system is turned on as illustrated in FIG. 10A, and it may be seen that a light intensity of about 40,500 cd or more may be maintained over the entire light pattern.

Figure 12:
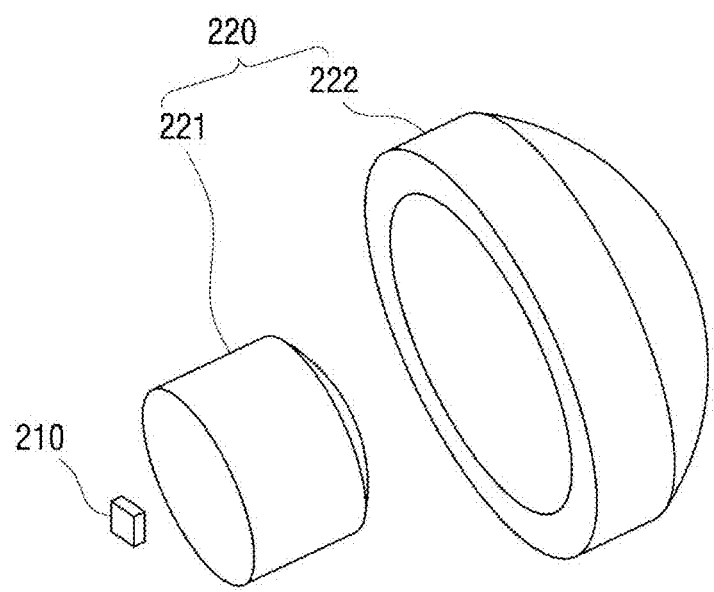
FIG. 12 is a view illustrating a lamp according to an exemplary embodiment of the present disclosure.

FIG. 12 is a view illustrating a lamp according to an exemplary embodiment of the present disclosure. A lamp 200 according to an exemplary embodiment of the present disclosure may include a light-emitting unit 210 and an optical lens 220. Since a description of the optical lens 220 substantially corresponds to the optical system 110 of the FIGS. 1 to 11, the repeated description will be omitted below.

The light-emitting unit 210 may be a pixelized light-emitting body. The optical lens 220 may include a plurality of lenses 221 and 222, transmit light emitted by the light-emitting unit 210, and receive the range of 60° or more of the light emitted by the light-emitting unit 210. A light intensity value of a light pattern formed by light which is emitted by the light-emitting unit and passes through the lens may be about 40,500 cd or more, and a size of each pixel that forms the light pattern may be in the range of about 0.15° to 0.35°. A viewing angle of the optical lens 220 may be in the range of about 4.8 to 11.2, and an effective focal distance may be in the range of about 28 mm to 70 mm.

The optical lens 220 may include the first lens 221 and the second lens 222, a refractive index of the first lens 221 disposed at a side of the light-emitting unit may be about 1.6 or more, a refractive index of the second lens 222 may be in the range of about 1.4 to 1.7, and a curvature ratio between the first lens 221 and the second lens 222 may be in the range of about 1.2 to 3.0. An incidence surface of the first lens 221 may be a flat surface or a surface similar to a flat surface (e.g., a substantially flat surface), and an incidence surface of the second lens 222 may be formed in a concave shape to minimize chromatic aberration.

According to exemplary embodiments of the present disclosure, an optical system having a large light receiving angle for a pixelized light-emitting unit may increase an efficiency of the optical system. Effects according to the present disclosure are not limited to the above-described effect, and more various effects have been described in the specification.

It will be understood by those skilled in the art that the present disclosure may be performed in other forms without changing the technological scope and essential features. Therefore, the above-described embodiments should be considered in an exemplary sense only and not for purposes of limitation. The scope of the present disclosure is defined not by the detailed description but by the appended claims and encompasses all modifications and alterations derived from meanings, the scope and equivalents of the appended claims.

What is claimed is:

1. An optical system, comprising:
a first lens having a first refractive index; and
a second lens disposed in front of the first lens, wherein the second lens has a concave incidence surface and a second refractive index,
wherein a curvature ratio between the first lens and the second lens is in a range of about 1.2 to 3.0, and
wherein the first refractive index of the first lens is greater than the second refractive index to increase an angular range of light that is received at the first lens and transmitted to the second lens to generate a beam with substantially parallel light rays.

2. The optical system of claim 1, further comprising a light-emitting unit.

3. The optical system of claim 2, wherein the light-emitting unit includes a pixelized light-emitting body.

4. The optical system of claim 2, wherein the optical system receives light emitted by the light-emitting unit in a range of 60° or more.

5. The optical system of claim 1, wherein a light intensity value of a light pattern formed by the light which passes through the lenses is about 40,500 candela (cd) or more.

6. The optical system of claim 5, wherein a size of each pixel which forms the light pattern is in a range of about 0.15° to 0.35°.

7. The optical system of claim 1, wherein a view angle of the optical system is in a range of about 4.8° to 11.2°.

8. The optical system of claim 1, wherein an effective focal distance of the optical system is in a range of about 28 mm to 70 mm.

9. The optical system of claim 1, wherein an incidence surface of the first lens is a flat surface or a substantially flat surface.

10. The optical system of claim 1, wherein the first refractive index is about 1.6 or more.

11. The optical system of claim 1, wherein the second refractive index is in a range of about 1.4 to 1.7.

12. A vehicle lamp, comprising:
a pixelized light-emitting unit; and
an optical lens configured to transmit light emitted by the light-emitting unit,
wherein the optical lens includes:
a first lens disposed proximate to the light-emitting unit and having a first refractive index; and
a second lens disposed farther from the light-emitting unit than the first lens and having a concave incidence surface and a second refractive index, and
wherein a curvature ratio between the first lens and the second lens is in a range of about 1.2 to 3.0, and
wherein the first refractive index is greater than the second refractive index to allow the optical lens to receive the light emitted by the light-emitting unit in a range of about 60° or more to generate a beam with substantially parallel light rays.

13. The vehicle lamp of claim 12, wherein a light intensity value of a light pattern formed by light which is emitted by the light-emitting unit and passes through the lens is about 40,500 candela (cd) or more.

14. The vehicle lamp of claim 13, wherein a size of each pixel which forms the light pattern is in a range of about 0.15° to 0.35°.

15. The vehicle lamp of claim 12, wherein a view angle of the optical lens is in a range of about 4.8° to 11.2°, and an effective focal distance of the optical lens is in a range of about 28 mm to 70 mm.

16. The vehicle lamp of claim 12, wherein an incidence surface of the first lens is a flat surface or a substantially flat surface.

17. The vehicle lamp of claim 12, wherein the first refractive index is about 1.6 or more, or the second refractive index is in a range of about 1.4 to 1.7.

* * * * *